March 11, 1947. R. G. WEYANT 2,417,226
DEVICE FOR MOLDING OF VENEER STRUCTURES
Filed March 13, 1944 2 Sheets-Sheet 1
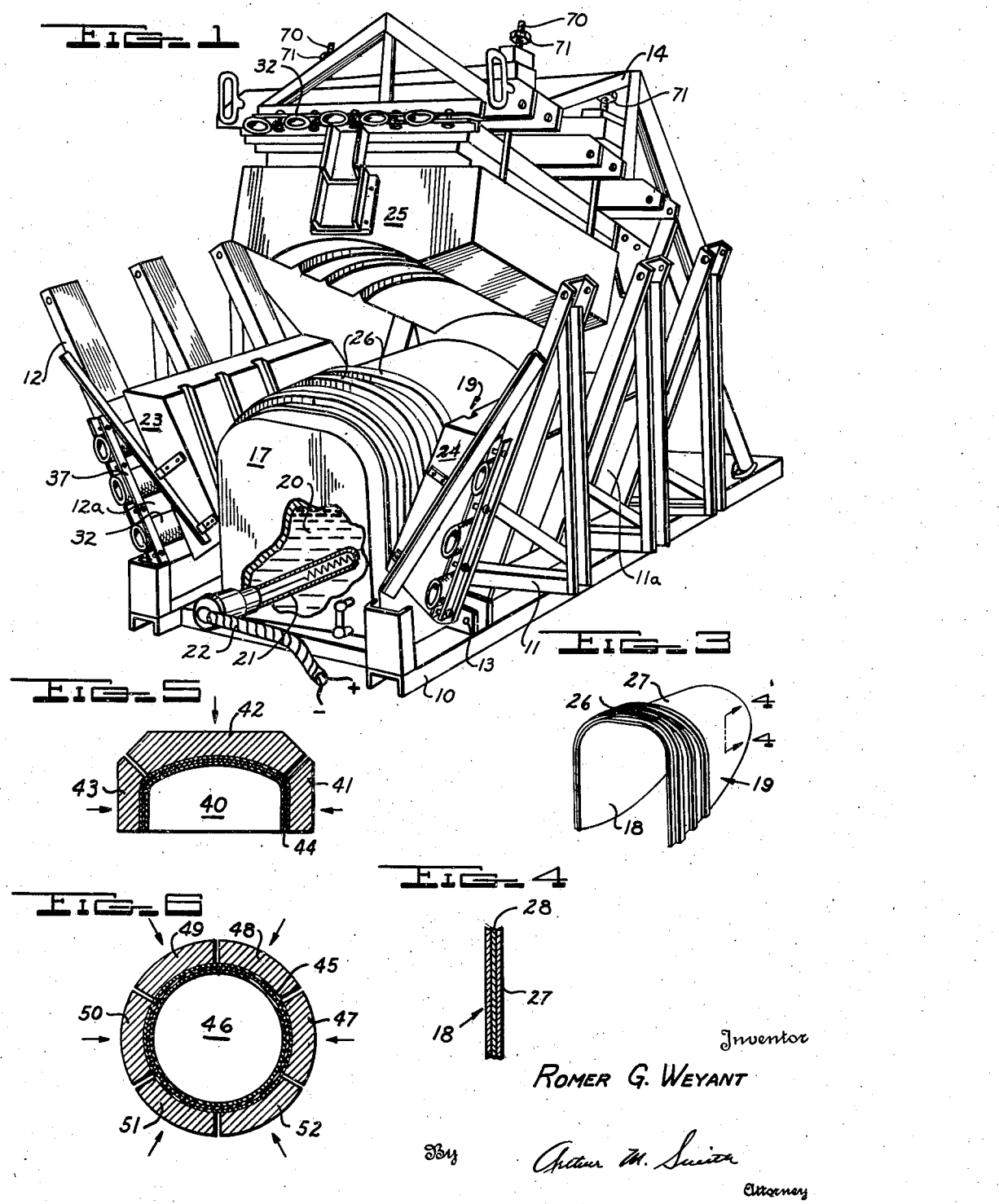
Inventor
ROMER G. WEYANT
By Arthur M. Smith
Attorney

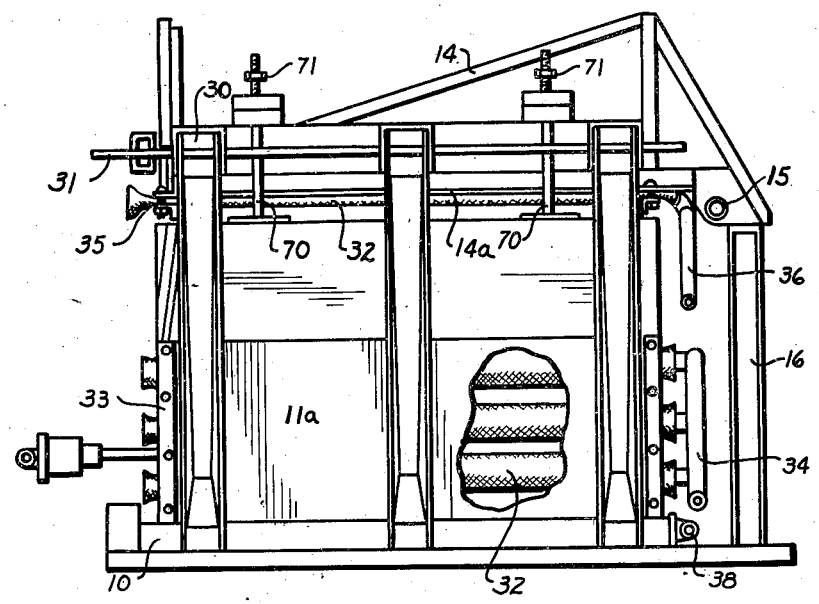

Patented Mar. 11, 1947

2,417,226

UNITED STATES PATENT OFFICE 2,417,226

DEVICE FOR MOLDING OF VENEER STRUCTURES

Romer G. Weyant, Elkhart, Ind., assignor to Superior Industries, Incorporated, Goshen, Ind., a corporation of Indiana Application March 13, 1944, Serial No. 526,187

4 Claims. (Cl. 144—281)

The present invention relates to the molding of veneer structures, such for example as molded plywood, in which superimposed laminated layers are bonded together with thermo-setting or thermo-plastic resin adhesives. More particularly, the present invention relates to a novel method and apparatus for molding such structures utilizing a mandrel and sectional die having rigid pressure and heat applying surfaces conforming to the surface contours desired in the finished molded structure.

Among the principal objects of the present invention are:

1. To provide a novel method for producing molded structures of superimposed laminations bonded together by heat and pressure fused adhesives and in which the heat and pressure is applied through rigid surfaces having fixed contours.

2. To provide molded structures of superimposed laminations which have improved strength-weight ratios, elasticity, and resistance to changes due to moisture and temperature variation because of the novel fabrication thereof according to the method of the present invention.

3. To provide a novel method of molding structures from superimposed laminations, particularly thin sheets of wood or other flexible fibrous materials, impregnated with a thermo-setting or thermo-plastic resin adhesive, and in which the said laminations and adhesives are fused by the application of heat and pressure to form an integrated structure, either with or without the addition of reinforcing members.

4. To provide a novel method of molding resin bonded plywood structures utilizing a plurality of superimposed thin wood veneer laminations bonded together by heat fused resins between rigid heat and pressure applying surfaces, to provide a unitary structure having high strength-weight ratios, a high degree of resistance to thermal changes, and substantially complete imperviousness to moisture.

5. To provide a novel method and apparatus for molding laminar structures utilizing heat and pressure applied through rigid segmental surfaces by which the pressures if desired may be selectively applied at variable times and in separately controlled amounts to allow the application of varying pressures to the molded structure over predetermined areas and during predetermined times in the course of the molding or curing operation.

6. To provide a novel method and apparatus for molding laminar structures in which the bonding time is reduced over that required for comparable operations using a flexible pressure applying member, the method and apparatus of the present invention permitting the use of substantially greater pressures during the molding operation than can be used satisfactorily with flexible pressure applying members.

7. To provide a novel method and apparatus for molding laminar structures utilizing heat and pressure applied through rigid surfaces and in which the heat and pressure are separately applied to the laminor structures through rigid male and female die members.

8. To provide a novel method and apparatus for molding laminar structures utilizing heat and pressure applied through rigid surfaces and in which heating of the laminar structure during the bonding process is controlled to provide a uniform heating of the said structure within predetermined limits independently of the application of pressures thereto.

9. To provide a novel method and apparatus for molding laminar structures utilizing heat and pressure applied through rigid surfaces and in which the rigid die elements have fixed surface contours which are utilized to apply heat and pressure to predetermined areas of the laminar structure during the molding thereof.

Prior to the present invention a method commercially used in the manufacture of laminar structures from resin impregnated thin wood veneers, utilized a flexible bag, sheet or curtain which was pressed into contact with the surfaces of the laminated structure by fluid pressure. The fluid pressure usually was exerted by steam or other heated fluid medium in a pressure autoclave. The pressure applying medium also supplied the heat units which were required to effect a cure of the adhesive or fusion of a thermo-setting or thermo-plastic resin binder. The use of such methods required a relatively long curing cycle which varied with the types of adhesive or binder employed, the thickness of the laminated sections and the like. In a typical instance using a phenol formaldehyde resin as the binder, a curing cycle was ten minutes, using a temperature of from approximately 280 to 300 degrees F. and pressures of approximately 200 pounds per square inch. Using a urea formaldehyde resin in a typical instance, the curing cycle was five minutes, using temperatures of from approximately 240 to 260 degrees F. and pressures of approximately 200 pounds per square inch.

Using comparable materials to form comparable objects, the method of the present invention permits an increase in the pressures employed and a reduction to approximately three minutes for the total time required in the curing cycle. Likewise it permits a greater flexibility in the curing cycle as the temperatures and pressures utilized may be varied relative to each other, since the pressure applying medium and the heating medium are controlled independently of one another.

In addition, the method of the present invention permits greater control over the characteristics of the surfaces of the molded member since pressures are applied of a sufficient magnitude to prevent a waving, rippling, or warping of the surfaces which are in contact with the die and the mandrel respectively.

Other objects of this invention will appear in the following description and appended claims, reference being had to the accompanying drawings forming a part of this specification wherein like reference characters designate corresponding parts in the several views.

In the drawings:

Fig. 1 and Fig. 2 are respectively perspective and side elevations having broken away portions showing one form of press utilized in carrying out the method of the present invention. Fig. 1 shows the press in the open position and Fig. 2 shows the press in the closed position.

Fig. 3 is a fragmentary perspective view of a molded laminar structure made according to the method of the present invention and utilizing the press construction shown in Figs. 1 and 2.

Fig. 4 is a section taken substantially on the line 4—4 of Fig. 3 looking in the direction of the arrows.

Figs. 5, 6, 7 and 8 are sectional diagrammatic views each showing a different construction and contour which may be utilized in carrying out the method of the present invention.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

According to the method of the present invention, a molded laminar structure may be made by coating separate thin layers of fibrous material, such as thin wood veneers, with a suitable heat curing adhesive or binder, such for example as a phenol formaldehyde partial condensation resin, a urea formaldehyde partial condensation resin, or a similar type of adhesive or binder which may be described generally as either a thermo-setting or thermo-plastic resin. Such resins in a partially polymerized state may be used to coat the separate layers of the thin laminated material and allowed to dry. The several layers which are required to make up the final laminated construction are then superimposed and subjected to heat and pressure for a sufficient time to cause the resins to completely polymerize or to fuse and bind the respective laminations into a composite laminar structure.

The temperatures and pressures to be employed and the time required to complete the fusion or bonding operation will vary with the types of adhesive or binder employed, the types, thickness and number of the laminations utilized and the structural characteristics desired in the finished product.

The layers or laminations coated on adjacent surfaces with the adhesive or binding agent are superimposed one on the other to form a flat blank, which is to be thereafter cured into the finished article here shown as having curvilinear surfaces. The sizes and shapes of the surfaces which determine the characteristics of the finished article are imparted to the flat, uncured, laminated blank by placing the blank over a rigid supporting and forming member, and applying a pressure between said member and a mating die member. Either the rigid supporting member or the mating die member or both may be sectional so as to permit the application of pressure on the blank between the die member and the rigid supporting member or mandrel, either by the expansion or the contraction of the sectional member as may be required. Both the rigid supporting member and the mandrel are provided with rigid, inflexible, die surfaces which have been preformed to the desired contours of the desired finished article. Thus when pressure is exerted on the flat blank, it will conform to the surface configurations of the rigid supporting member or mandrel and to the die surfaces of the external die member. Heat is applied through the die member or the mandrel, or both, as may be desired. Thus the laminated blank is subjected simultaneously to heat and pressures which are separately controlled and which may be varied relative to each other as may be required to secure the most advantageous cycle. In addition, by varying the pressures at various times during the curing cycle or by exerting fixed pressures of substantially greater magnitude than those which can be achieved in conventional processes using steam and a pressure autoclave, it is possible to impart exceptionally high weight-strength ratios to the molded laminar structure, and also to make such structure substantially impervious to moisture and relatively uneffected by thermal changes to which it may be subjected.

In carrying out the method of the present invention, a press such as that shown in Figs. 1 and 2 may be utilized. As here shown, the press consists of a base portion 10, on which is mounted a plurality of vertically extending members 11 and 12, each of which is hinged as at 13 to the base portion 10. The top frame member 14 is hinged as at 15 to a vertical top supporting frame 16. The mandrel 17 is mounted on the base portion 10, and is shaped as may be required to provide the surface contours desired in the completed articles. In the form shown in Figs. 1 and 2, the mandrel 17 is shaped so as to form the inner contour 18, for example that of a laminated plywood seat, such as shown in Fig 3. As shown in Fig. 1 a blank of laminated material has been placed over the mandrel 17, and the curing operation has been completed. The press when in the position shown in Fig. 1 is open so as to permit removal of the work piece 19, in this instance the molded seat shown in Fig. 3.

Heat is applied through the mandrel 17 in any desired way. One way to insure uniform heating of the mandrel 17 is to provide an internal oil reservoir in which a body of circulating oil, 20, is provided. The oil 20 is heated by any suitable type of heating mechanism, such for example as an electrically heated immersion heater 21 which is suitably connected as by the conduit 22 with suitable controls (not shown) and a source of electric energy (not shown). Utilizing such a construction, the mandrel 17 will at all times be maintained at a uniform temperature within the predetermined limits permitted by the particular control operations.

The external contour of the work piece is determined by the sectional die which comprises the side sections 23 and 24 and the top section 25. The die sections 23, 24 and 25 are carried by the frame sections 12, 11 and 14 respectively and are bodily moveable therewith. Each die section is connected with its frame section in any suitable manner which will permit limited movement of each die section relative to its supporting frame member. One suitable method of connecting the die sections to the frames is best shown in Figures 1 and 2 in connection with the die section 25 and the frame 14. As there shown, the die section 25 is suspended from the frame structure by a plurality of stay bolts 70, each of which is secured to the die section 25 and extends through the frame 14. A nut 71 is connected with each stay bolt 70 and prevents disconnection of the die section 25 from the frame 14. The stay bolts 70 are free to slide relative to the frame 14 to the extent that relative movement is desired between the die section 25 and the frame 14. Each of the segments 23, 24 and 25 are shaped so as to form the desired external surface contour on the work piece, which in the instance here shown comprises a series of reinforcing members 26, which are bonded on to the outer surface 27 of the work piece 19. As shown in Fig. 4, the work piece is formed of three laminations, i. e. the interior surface lamination carrying the interior surface 18, the lamination carrying the exterior surface 27, and an intermediate layer 28. The reinforcing members 26 are bonded to and become an integral part of the lamination carrying the exterior surface 27.

After a flat blank of superimposed laminations having an uncured or unbonded adhesive between the adjacent surfaces has been placed over the mandrel 17, the sectional dies 23, 24 and 25 are brought into position on the exterior surfaces of the work piece. The vertical members 11 and 12 are locked to the respective cross members 30 of the top frame work 14 by means of a locking rod 31.

Pressure causing movement of the die sections 23, 24 and 25 relative to the locked supporting frame structure of the press, is then applied to each of the sections 23, 24 and 25 of the sectional die member by means of fluid pressures exerted through a pluraltiy of flexible fluid tight members 32, which act as fluid pressure exterting members. In the particular instance shown in Figs. 1 and 2, the members 32 are each formed of one length of a tightly woven impregnated fabric material, capable of withstanding high pressures, such for example as woven fire hose. A plurality of lengths of such material are provided between the frame members 12, 11 and 14 and the attached die segments 23, 24 and 25. As best shown in Fig. 2, a clamp 33 is provided to close one end of each of the tubes 32. The opposite ends of the tubes are connected with a manifold 34 through which a suitable pressure exerting fluid is supplied. This may be done utilizing any suitable type of hydraulic or pneumatic pressures as desired. A similar clamp 35 and manifold 36 is provided for the exerting of pressures on the section 25 of the sectional die. A clamp 37 and a manifold 38 of similar construction and operation is provided so as to permit the exerting of pressure through the members 32 to section 23 of the die.

After the press has been closed as shown in Fig. 2, suitable pressures are exerted through the members 32 by a suitable pressure exerting medium supplied through the manifolds 34, 36 and 38. The expansion of the members 32 against the plates 11a, 12a and 14a, carried respectively by the frame members 11, 12 and 14 causes the exertion of pressures on the respective sections 23, 24 and 25, of the sectional dies causing them to move relative to the frame members 11, 12 and 14 and toward the mandrel 17. Since the supply of hydraulic fluid to each of the manifolds 34, 36 and 38 may be independently controlled, it will be seen that varying pressures may be exerted if desired on the sections 23, 24 and 25. In the formation of the work piece, such for example as that shown in Fig. 3, it is preferable that uniform pressures be exerted on the various sections 23, 24 and 25 of the sectional die. It will also be seen that the pressure is exerted on the work piece through the sectional die formed by the sections 23, 24 and 25, independently of the application of heat to the press and the work piece by means of the mandrel 17. It will also be observed that in all instances the pressure is exerted through the rigid die sections 23, 24 and 25 so that the actual application of pressure to the work piece is through rigid pressure applying die surfaces. This is a desirable feature of the present invention for it assures a smoothness and uniformity of surface which sometimes is missing from work pieces fabricated by conventional methods in which the pressure is applied to the work piece through a flexible sheet or by fluid pressures.

In the formation of the work piece as shown in Fig. 3, the reinforcing members 26 in the form of laminated veneer bow members, substantially U-shaped in cross-section, are placed over the flat blank. These members 26 are preferably formed in a prior operation and are detached from the work piece prior to the curing or bonding thereof by the method here shown.

By the application of heat and pressure to the article, the parts, including the reinforcing members 26, are fused or bonded together so that the integral composite structure shown in Fig. 3 is produced.

It is to be understood that any desired type of laminated layers and any desired type of heat curing adhesive may be employed in carrying out the method of the present invention and the present method, therefore, is not limited in its use to particular materials. It is also to be understood that various types of press constructions may be employed and that various contours of mandrels and sectional dies may likewise be employed. Therefore, the invention is not limited to the particular form of apparatus herein disclosed.

Figs. 5 to 8, inclusive, are diagrammatic sectional views of various types of mandrel and die constructions which may be satisfactorily employed in connection with methods embodying the present invention. It is to be understood that these views are shown solely for purposes of description and not of limitation as various other forms may be employed by those skilled in the art without departing from the scope of the present invention.

As shown in Fig. 5, a mandrel 40, having a curved top surface and straight edge surfaces, may be employed and pressures may be exerted thereon through sectional dies 41, 42 and 43. The pressure is exerted through the dies 41, 42 and 43 in any suitable type of pressure exerting press. The arrows indicate the directions of pressure application on the dies 41, 42 and 43. The work piece 44 will be formed from laminated superimposed layers which are fused by the application of heat through the mandrel 40 and pressures through the sectional dies 41, 42 and 43.

Another form of work piece which may be formed according to the present invention may be circular in cross-section as shown at 45 in Fig. 6. In this instance a circular mandrel 46 is employed and an exterior die made up of the sections 47, 48, 49, 50, 51 and 52 is employed. Pressures are exerted through any suitable type of press on the segments 47 to 52, inclusive, in the direction of the arrows shown on this figure.

A section having curvilinear contours as shown in the work piece 53 is shown in Fig. 7. In this construction the mandrel 54 has an exterior surface which is shaped to conform to the desired final shape of the work piece 53, and the exterior surface of the work piece is formed by the mating die member which consists of the sectional dies 55, 56, 57, 58 and 59. Pressures are exerted on the sectional dies 55 to 59, inclusive, by any desired type of press exerting pressures in the direction of the arrows here shown.

A work piece 60 generally rectangular in cross-section may be formed utilizing the mandrel and die construction shown in Fig. 8 in which the mandrel 61 is generally rectangular in cross-section to conform to the internal surface area and contours of the work piece 60. Pressure is exerted by an external die comprising the sections 62, 63, 64 and 65. Pressures are exerted on the sections 62 to 65, inclusive, in any desired manner and in any desired type of press. The application of pressure is indicated by the arrows shown on this figure.

In all of the constructions here shown, the heat required for the bonding of the laminated article is supplied through the heated mandrel and the pressures are applied through the sections of the external die. It is to be understood, however, that heat may also be applied through the external die portions, if desired, and also it is to be understod that a sectional mandrel may be employed in instances where this is desirable and pressures may be applied to the work piece through the sectional mandrel as well as through the external die, or, if desired, in place of, the application of pressures through the external die member.

It will be observed that in all of the embodiments of the invention here shown, heat and pressures are applied separately to the laminated work piece so as to provide a completed article having the desired weight-strength ratios, impermeability to moisture, elasticity, and resistance to thermal change. Any desired type of control mechanism may be employed for controlling the heat during the process. Such controls may be either thermostatically or manually controlled. The mandrel provides in each instance a rigid supporting or forming surface over which the blank is placed. The mandrel is shaped to conform to the specified contour and dimension of the production item desired, and is built of any suitable material which will withstand the required bonding pressures and which will have uniform heat conducting and radiating characteristics. The structural and mechanical design of the mandrel is determined by the size of the item to be produced and the method of pressure application to be employed. The method of heating the mandrel is optional so long as a constancy of measured temperature is achieved.

The sectional dies are designed to furnish controlled pressure over the veneer blank and to cause the blank to conform to the surfaces of the mandrel as well as to the surfaces of the die. The thickness and number of the veneer plies as well as the shape and size of the item to be formed govern the structural and mechanical design of the die or dies. In all instances, however, the contour of the die or dies shall be held within controlled precision limits for seating over the material to be bonded and the mandrel surface is such as not to be deflected by the bonding pressures employed. The number of sectional dies employed and their actuating mechanism may be varied as may be required for particular applications in the light of production requirements.

While it is preferable that the veneer layers shall be preassembled using pregluing of the veneer layers, it is to be understood that this is not essential as the separate layers may, if desired, be placed over the mandrel one at a time and then the die brought into place and pressures applied thereto. The bonding time, the charging of the press, and the release period are variable factors which depend primarily upon the type of adhesive employed, the type, thickness and number of veneer layers, the percent of moisture content and the kind of material to be used in the veneer.

A wide variety of shapes and sizes of production items may be produced according to the present method, and such items will have a wide range of application for various commercial uses. A principal advantage of the present process is in all instances the increased bonding pressures which can be obtained will considerably reduce the time required in the curing cycle. The use of such increased pressures also has produced greater structural strength-weight ratios than those obtained by other methods. This is particularly desirable in molded products designed for aricraft use where the weight-strength ratio is the key factor in the design of the parts. In addition, the present method permits controlled directional design of the veneers to be bonded so as to meet maximum stress requirements. This may be accomplished because of the range of die design which is possible. Also it is to be understood that various types of reinforcing or strengthening members may be bonded to and become an integral part of the completed molded work piece.

While I have here shown the use of structural members formed of laminated materials, such as plywood, it is to be understood that other types of structural members, such for example as metal, plastic or fabric materials, may also be similarly applied to and become a part of the article as a result of carrying out of the present process.

I claim:

1. A veneer press comprising a rigid mandrel, a movable frame surrounding said mandrel, a sectional die secured to said frame and movable therewith and having internal rigid surfaces mating with the external surfaces of said mandrel when said frame is moved into closed position, means for uniformly heating said mandrel and a plurality of extensible, fluid tight, flexible pressure exerting members overlying each section of said sectional die and disposed between said frame and said sectional die for applying pressures to the separate sections of said rigid sectional die after the said frame is moved into closed position.

2. A veneer press as claimed in claim 1 and further characterized in that said means for uniformly heating said mandrel comprise an internal reservoir in said mandrel which is filled with oil which is heated by an electrically heated immersion heater.

3. A veneer press comprising a fixed hollow mandrel having a rigid exterior surface corresponding in shape to the desired internal shape of a veneer article to be formed in said press, a rigid frame surrounding said mandrel and movable relative thereto to permit ready charging and unloading of the press, a sectional die movably connected to said rigid frame and having rigid surfaces mating with the exterior surfaces of the said mandrel and means interposed between the sections of said die and said rigid frame for applying pressures to effect movement of said die sections relative to said frame and comprising a plurality of lengths of an air tight flexible hose, each length lying between said frame and said die and each connected with a source of pneumatic pressure to effect inflation thereof and the exertion of pressures upon the adjacent section of said die.

4. A veneer press comprising a fixed hollow mandrel having a rigid exterior surface corresponding in shape to the desired internal shape of a veneer article to be formed in said press, a rigid frame surrounding said mandrel and movable relative thereto to permit ready charging and unloading of the press, a sectional die movably connected to said rigid frame and having rigid surfaces mating with the exterior surfaces of the said mandrel, means interposed between sections of said die and said rigid frame for applying pressures to effect movement of said die sections relative to said frame and comprising a plurality of lengths of an air tight flexible hose, each length lying between said frame and said die and each connected with a source of pneumatic pressure to effect inflation thereof and the exertion of pressures upon the adjacent section of said die, and means for uniformly heating said hollow mandrel and comprising an electric heater of the immersion type mounted in said chamber and surrounded by a heat conducting fluid maintained in heat exchange relation with the walls surrounding the hollow interior of said mandrel.

ROMER G. WEYANT.

REFERENCES CITED

The following references are of record in the file of this patent:

UNITED STATES PATENTS

| Number | Name | Date |
|---|---|---|
| 229,198 | Steinway | June 22, 1880 |
| 1,021,526 | Huston | Mar. 26, 1912 |
| 2,025,451 | Hirschfield | Dec. 24, 1935 |
| 1,777,310 | Hopkinson | Oct. 7, 1930 |
| 2,073,290 | Teague | Mar. 9, 1937 |
| 2,276,004 | Vidal et al. | Mar. 10, 1942 |
| 2,322,962 | Dickson et al. | June 29, 1943 |
| 2,337,250 | Klassen | Dec. 21, 1943 |
| 2,363,933 | Bendix | Nov. 28, 1944 |

FOREIGN PATENTS

| Number | Country | Date |
|---|---|---|
| 467,952 | British | June 25, 1937 |

OTHER REFERENCES

Page 29, Automotive and Aviation Industries June 1, 1943.